US007196259B2

(12) United States Patent
Aoki et al.

(10) Patent No.: US 7,196,259 B2
(45) Date of Patent: Mar. 27, 2007

(54) PERFORMANCE DATA TRANSMISSION CONTROLLING APPARATUS AND ELECTRONIC MUSICAL INSTRUMENT CAPABLE OF ACQUIRING PERFORMANCE DATA

(75) Inventors: Norihisa Aoki, Hamamatsu (JP); Hiroyuki Torimura, Hamamatsu (JP); Akira Suzuki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 366 days.

(21) Appl. No.: 10/339,590

(22) Filed: Jan. 9, 2003

(65) Prior Publication Data

US 2003/0131716 A1 Jul. 17, 2003

(30) Foreign Application Priority Data

Jan. 11, 2002 (JP) ............................ 2002-005022
Jan. 11, 2002 (JP) ............................ 2002-005024
Jan. 11, 2003 (JP) ............................ 2002-005023

(51) Int. Cl.
*G06F 17/60* (2006.01)

(52) U.S. Cl. ............................ 84/601; 705/26; 84/602

(58) Field of Classification Search ................ 365/198; 705/26; 94/600–609, 647
See application file for complete search history.

(56) References Cited

U.S. PATENT DOCUMENTS

| | | | | |
|---|---|---|---|---|
| 4,898,059 | A | 2/1990 | Iizuka | |
| 5,734,119 | A | 3/1998 | France et al. | |
| 5,773,741 | A | 6/1998 | Eller et al. | |
| 6,232,541 | B1 | 5/2001 | Kumagai | |
| 6,740,803 | B2 | 5/2004 | Brinkman et al. | |
| 2002/0042777 | A1 * | 4/2002 | Yoshida et al. | 705/41 |
| 2002/0095543 | A1 | 7/2002 | Shioda et al. | |
| 2002/0162445 | A1 | 11/2002 | Naples et al. | |
| 2003/0088775 | A1 | 5/2003 | Weimerskirch | |
| 2005/0033661 | A1 * | 2/2005 | Yoshida et al. | 705/26 |

FOREIGN PATENT DOCUMENTS

| | | |
|---|---|---|
| JP | 63-193189 | 8/1988 |
| JP | 05-188935 | 7/1993 |
| JP | 2000-181864 | 6/2000 |
| JP | 2000-209197 | 7/2000 |
| JP | 2001-013961 | 1/2001 |
| JP | 2001-028786 | 1/2001 |
| JP | 2001-042866 | 2/2001 |
| JP | 2001-127988 | 5/2001 |

* cited by examiner

*Primary Examiner*—Lincoln Donovan
*Assistant Examiner*—David S. Warren
(74) *Attorney, Agent, or Firm*—Morrison & Foerster LLP

(57) ABSTRACT

An electronic organ 1 and a personal computer 2 are connected with a MIDI cable. The personal computer 2 is connected to a server 4 via a communication network 3. The personal computer 2 downloads a controlling program from the server 4. The electronic organ 1 is set to be a listening trial mode by an operation of the personal computer 2. In the listening trial mode, an output of a data in a temporally storage area is prohibited. The server 4 provides a first encoded performance data to the personal computer 2, and the personal computer 2 decodes the received first encoded performance data. The electronic organ 1 generates a key, and the personal computer 2 secondary encodes the performance data with the key and transmits it to the electronic organ 1. The electronic organ 1 deletes the data stored in the temporally storage area after the listening trial.

6 Claims, 15 Drawing Sheets

PERFORMANCE DATA TRANSMISSION CONTROLLING APPARATUS AND ELECTRONIC MUSICAL INSTRUMENT CAPABLE OF ACQUIRING PERFORMANCE DATA

CROSS REFERENCE TO RELATED APPLICATION

This application is based on Japanese Patent Applications 2002-005022, 2002-005023 and 2002-005024, filed on Jan. 11, 2002, the entire contents of which are incorporated herein by reference.

BACKGROUND OF THE INVENTION

A) Field of the Invention

This invention relates to a performance data transmission controlling apparatus that transmits a performance data to an electronic musical instrument by using a communication network, an electronic musical instrument that can execute an automatic musical performance based on a performance data, a performance data transmission controlling program and a performance data acquiring program.

B) Description of the Related Art

Conventionally, in a field of an electronic musical instrument, computer music etc., there is a service that provides a performance data that is used for an automatic musical performance or the like via a communication network. For example, a personal computer or the like can receive a charged performance data provided from a server by using the Internet, and the received performance data can be input to an electronic musical instrument connected to this personal computer. The electronic musical instrument executes various performance or various processes based on the input performance data. Moreover, the performance data can be listened to for a trial before purchasing by a listening trial data.

Since the electronic musical instrument functions independently from the network, a normal operation is possible in a state connected to a computer. For example, copying of the performance data provided for a listening trial can easily be possible by editing in the electronic music device and transmitting to other storage medium. For this reason, there is a risk that the performance data for the listening trial is used illegally, and there is a problem from the point of view of protecting a copy right of the performance data.

Also, conventionally, the performance data is transmitted from a personal computer to the electronic musical instrument with a status wherein the performance data can be stored in a floppy disk is configured beforehand in the body of the electronic musical instrument. At this time, the personal computer only transmits the performance data without confirmation of a status of the storing unit (the floppy disk). So, in the case of the state wherein the performance data cannot be stored in a floppy disk by a lack of the confirmation by a user, the performance data cannot be stored in the floppy disk, and it causes that a purchased performance data for purchasing cannot be received.

By the way, the personal computer and the electronic musical instrument are mainly connected by a widely used cable based on the MIDI standards. Also, the standard MIDI performance data is widely used. For this reason, it is necessary that the data that is transmitted from the personal computer to the electronic musical instrument is transmitted with the standard MIDI data from a MIDI output. Also, since the performance data is the standard MIDI data, the standard MIDI performance data is transmitted from the personal computer to the electronic musical instrument without any conversions.

Therefore, the performance data output from the personal computer can be output without a limitation as a data that can be used for an automatic musical performance. Therefore, there is a risk that the performance data for a listening trial or purchasing is used illegally, and there is a problem from the point of view of protecting a copy right of the performance data.

SUMMARY OF THE INVENTION

It is an object of the present invention to make a performance data only for a listening trial not to be output to an outside and not to be handled without an authorization.

It is another object of the present invention to make a performance data for a purchase to be received properly.

It is further object of the present invention to make a performance data provided from a server not to be handled illegally.

According to one aspect of the present invention, there is provided a performance data transmission controlling apparatus, comprising: a first transmitting device that transmits a setting instruction for setting a listening trial mode to an external device when starting of the listening trial mode is instructed; a second transmitting device that transmits a performance data for a listening trial to the external device after the transmission of the setting instruction; and a third transmitting device that transmits a canceling instruction for canceling the listening trial mode when terminating of the listening trial mode is instructed.

According to another aspect of the present invention, there is provided a performance data transmission controlling apparatus, comprising: a first transmitting device that transmits a confirming instruction for instructing an external device to confirm a status of a storage unit of the external device; a receiving device that receives status information representing the status of the storage unit of the external device; and a second transmitting device that transmits a performance data to the external device when the receiving device receives the status information representing that the storage unit of the external device can store the performance data.

According to further aspect of the present invention, there is provided a performance data transmission controlling apparatus, comprising: a first receiving device that receives an encoded performance data from a server; a decoding device that decodes the received encoded performance data; an encoding device that encodes the decoded performance data again to be suited for a transmission path to an external device; and a transmitting device that transmits the performance data encoded by the encoding device to the external device.

According to yet further aspect of the present invention, there is provided an electronic musical apparatus, comprising: a memory having a temporally storage area that temporarily stores a performance data for a listening trial; a first receiving device that receives a setting instruction from an external device; a recording device that receives a performance data for a listening trial from the external device and records the received performance data for a listening trial into the temporally storage area; and a deleting device that deletes the received performance data for a listening trial in the temporally storage area when the listening trial mode is canceled.

According to yet further aspect of the present invention, there is provided an electronic musical apparatus, comprising: a memory that stores a performance data; a first receiving device that receives a confirming instruction from an external device; a generating device that generates status information representing a status of the memory in accordance with the received confirming instruction; a transmitting device that transmits the generated status information to the external device; a second receiving device that receives a performance data from the external device; and a recording device that records the received performance data into the memory.

According to yet further aspect of the present invention, there is provided An electronic musical apparatus, comprising: a generating device that generates a key for encoding/decoding a performance data; a transmitting device that transmits the generated key to an external device before receiving the performance data from the external device; a receiving device that receives a performance data encoded by using the transmitted key from the external device; and a decoding device that decodes the encoded performance data by using the generated key.

According to yet further aspect of the present invention, there is provided An electronic musical apparatus, comprising: a receiving device that receives an exclusive data based on MIDI standards and containing an embedded data from an external device; and a decoding device that decodes the embedded data into a performance data.

DETAILED DESCRIPTION OF THE PREFERRED EMBODIMENTS

Figure 1:
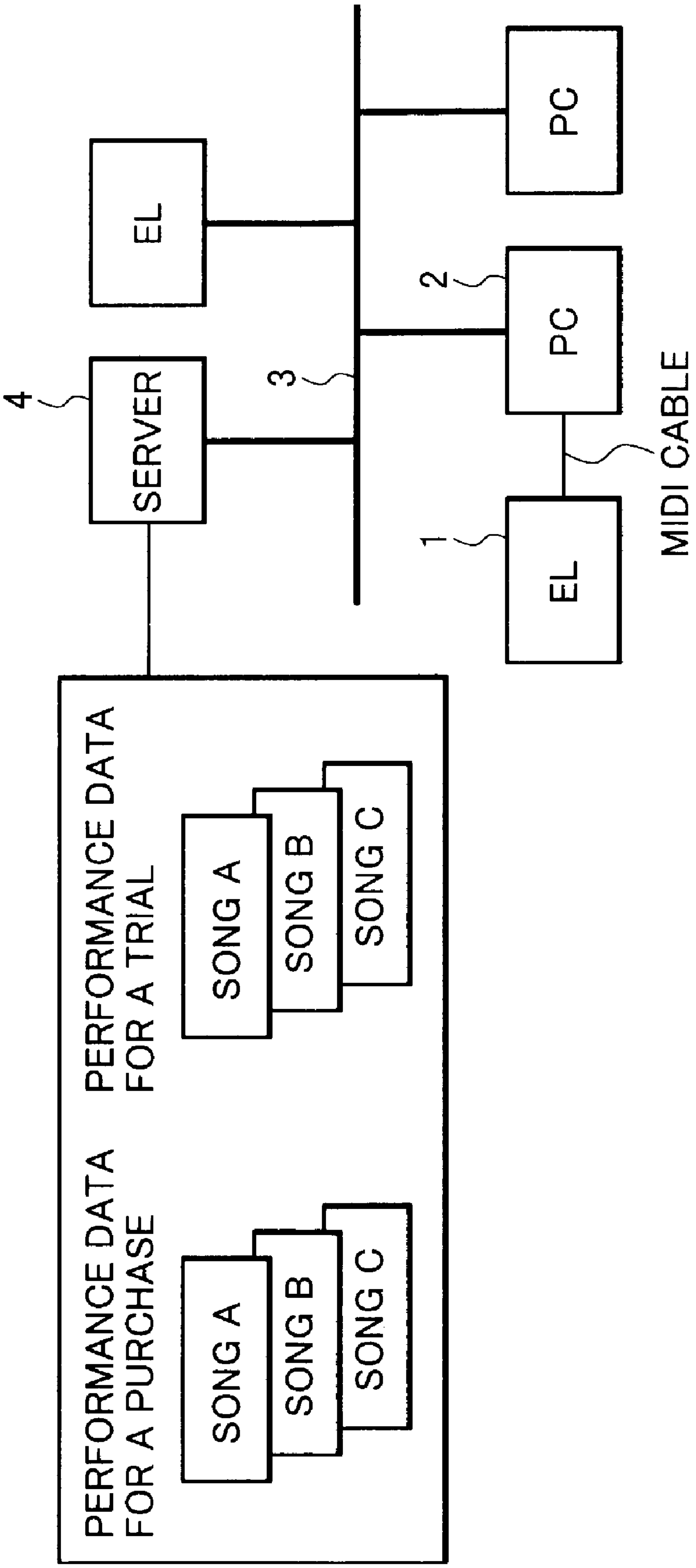
FIG. 1 is a schematic view of a whole system according to an embodiment of the present invention.

An embodiment of the present invention is explained in the below with reference to the drawing. FIG. 1 is a schematic view of a whole system according to the embodiment of the present invention, and the electronic organ (for example, "Electone" (a trade mark)) is intended as an electronic musical instrument in this embodiment. In the drawing, a personal computer is abbreviated to "PC", and an electronic organ is abbreviated to "EL". An electronic organ 1 is connected to a personal computer 2 as a performance data transmission controlling apparatus by a MIDI cable. Also, the personal computer 2 is connected to a server 4 (the computer) via a communication network 3 such as the Internet or the like.

The computer of the server 4 has a database and stores a performance data for a purchase and a performance data for a listening trial each corresponding to many songs. The performance data for a purchase and the performance data for a listening trial (hereafter both data are called "performance data") contain the reproduction state data and the song data.

Figure 2A:
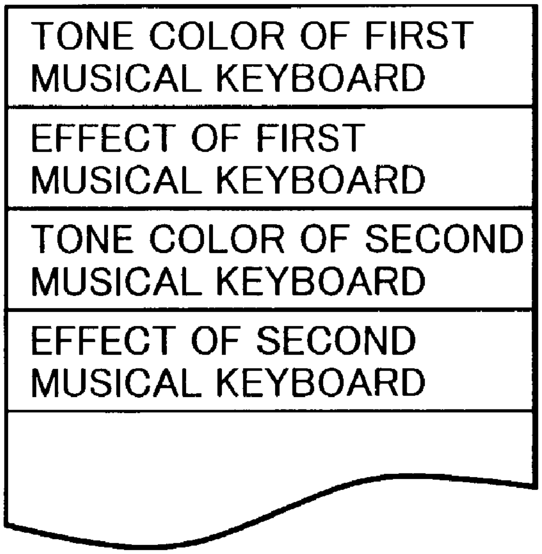
FIG. 2 shows an example of a reproduction state data and a song data according to the embodiment of the present invention.

The reproduction state data is a data called "registration" or "register". As shown in FIG. 2A, the reproduction state data is a data that defines various settings such as tone colors, effects or the like, for example, a data which designates a tone color of a first musical keyboard (a lower keyboard) of the electronic organ 1, a data which designates a tone color of a second musical keyboard (an upper keyboard) and a data which designates an effect in the second keyboard. Then, this reproduction state data is assigned to a register switch provided in an operating panel at the time of using the electronic organ 1, and the electronic organ 1 is set to be a state according to the assigned reproduction state data by operating the register switch.

Also, pluralities of the reproduction state data along with a flow of the music for each song are mostly used as a set. And in this case, the reproduction state data are respectively assigned to the plurality of the register switches. Therefore, for example, by operating the register switch during a musical performance with the musical keyboard (manual musical performance), a state such as the tone color and the effect can be switched along with the flow of the music during the musical performance. Moreover, in the case of the automatic musical performance, the reproduction state data is switched in accordance with an instructing data stored in the performance data, and the tone color and the effect can automatically be switched along with a flow of the automatic musical performance.

Figure 2B:
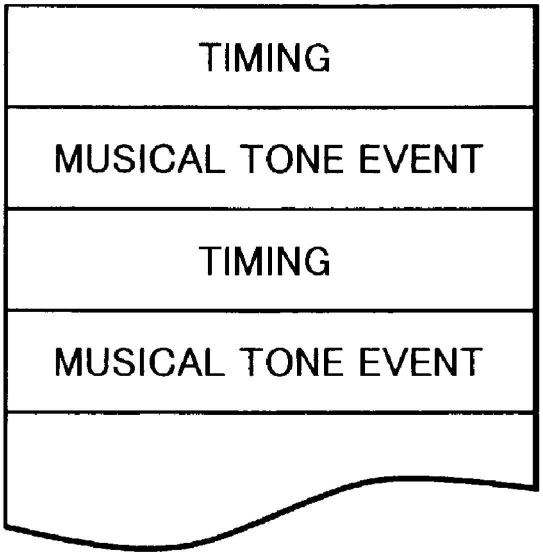

The song data is, for example, a data called "a song", and as shown in FIG. 2B, musical tone event data (MIDI event data), each corresponding to one musical tone, are stored along with performance timings. Also, as described above, the instructing data for the reproduction state data set at the time of the reproduction of the song is included.

Moreover, some performance data for a purchase and a listening trial have both of the reproduction state data and the song data, and others have only either one of them. For example, there is a song that has the song data only in the performance data for a listening trial. In this case, only the reproduction state data (registration) is purchased by the performance data for a purchase, and an actual song performance is performed with the musical keyboard. Also, some songs of which the performance data for a listening trial has only the reproduction state data. In this case, a listening trial of the reproduction state is performed with the setting by the reproduction state data and the musical performance with the musical keyboard. Moreover, some of the reproduction state data of the performance data for a listening trial are the same as the reproduction state data of the performance data for a purchase, and others are partly omitted from the reproduction state data of the performance data for a purchase.

Figure 3:
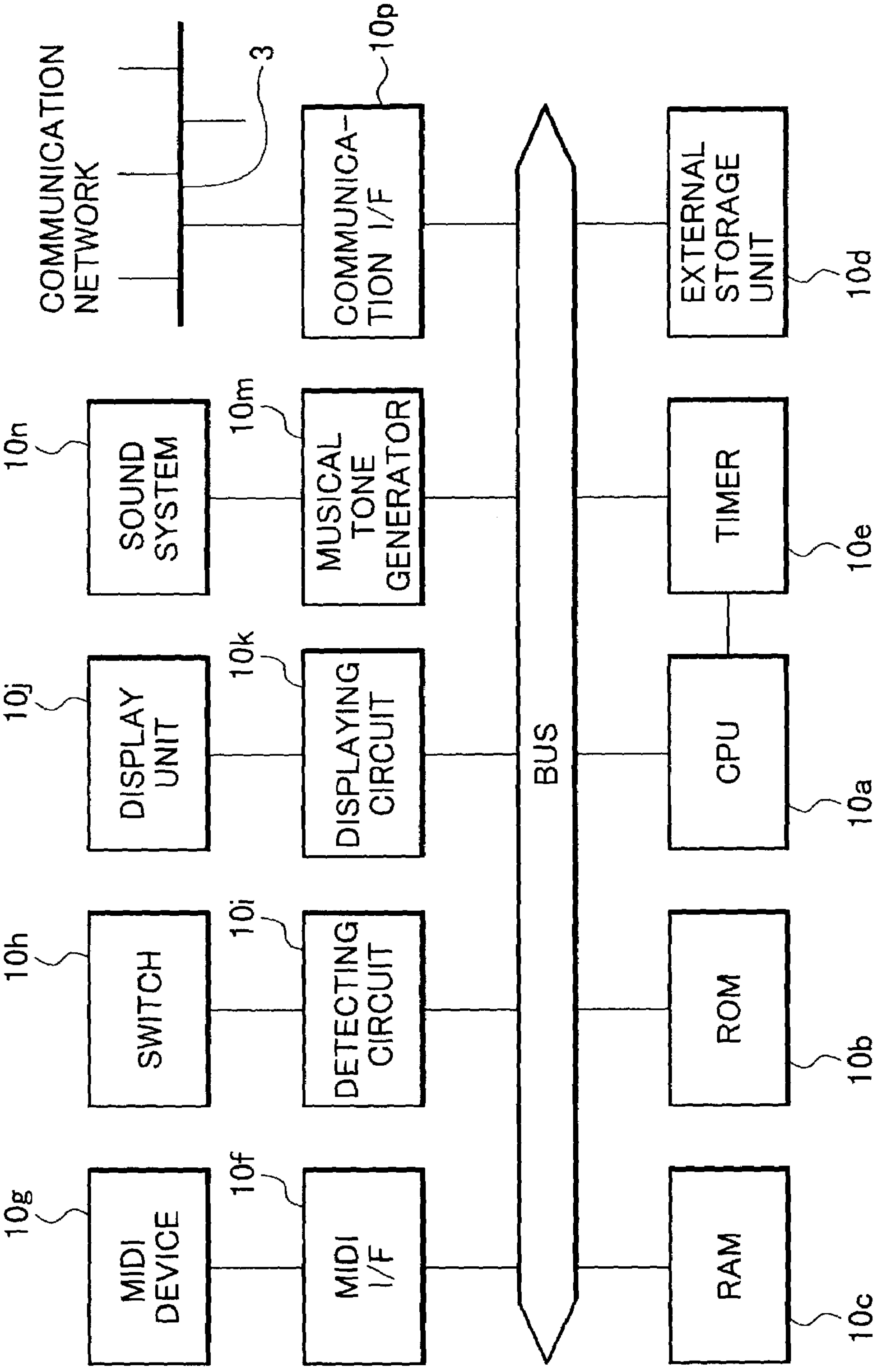
FIG. 3 is a block diagram of an electronic organ and a personal computer according to the present invention.

Either one of the electronic organ 1 and the personal computer 2 has basic structures such as a CPU, an input/output device, a storage device, etc., and fundamental hardware structures of both of them are schematically shown in a common block diagram in FIG. 3. The CPU 10*a* executes a control program stored in a ROM 10*b*, a RAM 10*c* or an external storage device 10*d* and realizes a function of the electronic organ 1 and the personal computer 2. A timer 10*e* supplies control timing and generates a reproduction clock signal, etc. at the time of an automatic musical performance. A MIDI interface (I/F) 10*f* inputs and outputs a MIDI signal to/from an external MIDI device 10*g*. Further, when this block diagram is the case of the electronic organ 1, the MIDI device 10*g* corresponds to the personal computer 2. And when this block diagram is the case of the personal computer 2, the MIDI device 10*g* corresponds to the electronic organ 1.

In the case of the electronic organ 1, a concrete example of each structure is as follows. The external storage device 10*d* is a floppy (a trademark) disk drive (FDD) according to the embodiment of the present invention, and a performance data for a purchase that is provided and purchased is stored in the floppy disk as a storage unit. Also, a switch 10*h* is a keyboard (lower keyboard, upper keyboard and pedal keyboard), a foot switch, or an operation panel switch etc., and various operations are detected by a detecting circuit 10*i*. Also, a display unit 10*j* is a liquid crystal display or the like provided on the operation panel and is driven by the CPU 10*a* via a displaying circuit 10*k*.

A musical tone generator 10*m* generates a musical tone signal corresponding to the various keyboard operations of the electronic organ 1 in accordance with the set tone color and outputs it to a sound system 10*n* such as an amp and a speaker etc. to generate a musical tone. Further, when the automatic musical performance is performed based on the song data, an interrupt process is executed in accordance with a clock supplied from the timer 10*e*, and data of various musical notes in the song data are reproduced. Then a note cord, a touch data, and note on/note off etc. are output to a musical tone generator 10*m* to generate a musical tone. Also, in the ROM 10*b*, a control program (a performance data acquiring program) is stored. Moreover, the electronic organ by itself can be connected to the communication network 3 via a communication interface 10*p*.

In the case of the personal computer 2, a concrete example of each structure is as follows. The external storage device 10*d* is a hard disk drive (HDD), the FDD, a compact disk-read only memory (CD-ROM) drive, a magneto optical disk (MO) drive and a digital versatile disk (DVD) drive, the control program (the performance data transmission controlling program) is downloaded from the server 4 to the external storage device 10*d*. Also, a switch 10*h* is a keyboard and a mouse etc., various operations are detected by the detecting circuit 10*i*. The display unit 10*j* is a liquid crystal display or a CRT display, etc. and is driven via the displaying circuit 10*k*, and an initial window and a listening trial window at the time of purchasing the performance data described later is displayed on that. Moreover, data is input and output to/from the server 4 as described above via a communication interface 10*p* and the communication network 3 to receive a providing service of the performance data used in the electronic organ 1 (the MIDI device 10*g*).

Figure 4A:
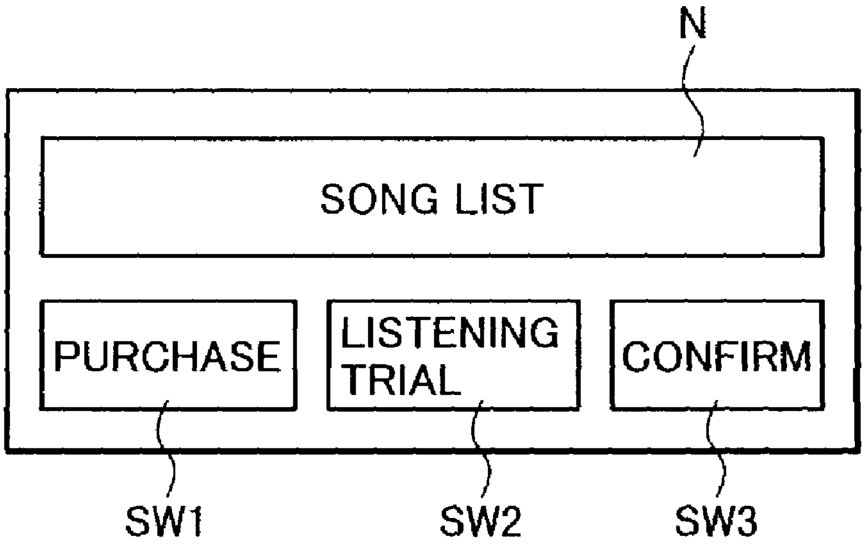
FIG. 4 shows examples of an initial window and a listening trial window according to the embodiment of the present invention.
Figure 5:
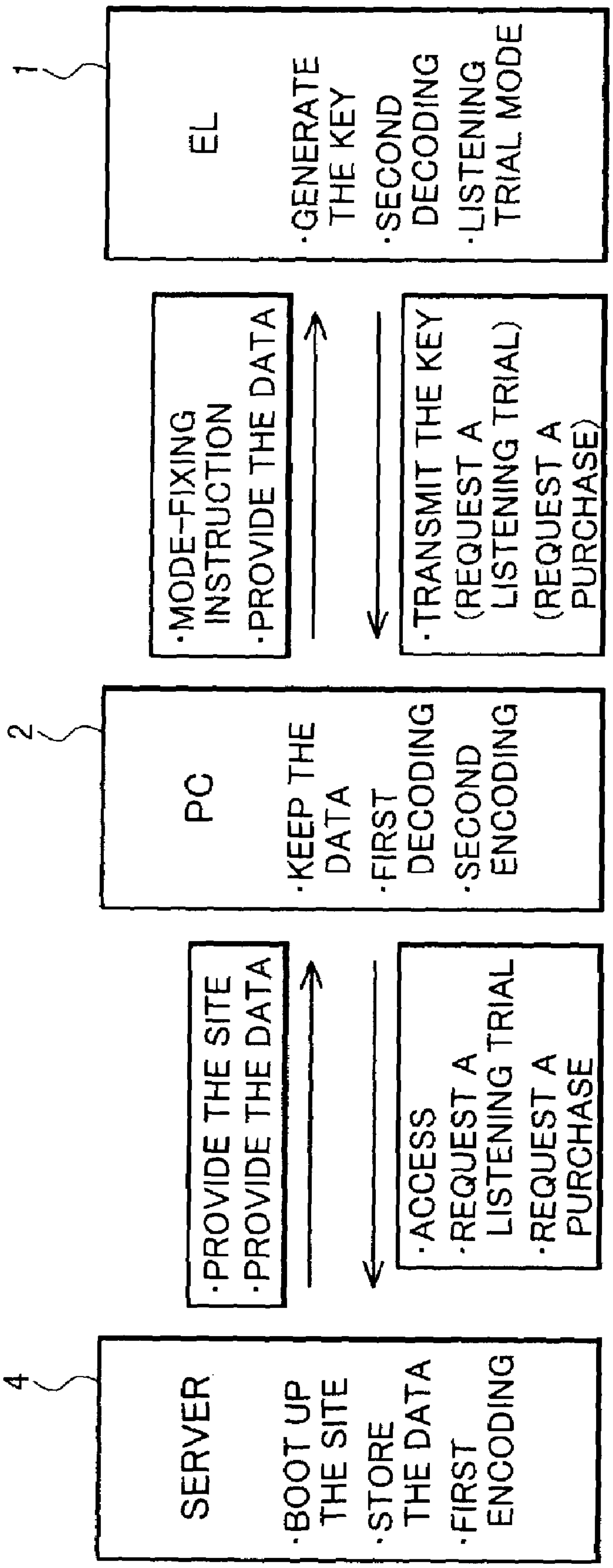
FIG. 5 is a schematic view showing a schematic movement, a data and a flow of instructions according to the embodiment of the present invention.

FIG. 5 is a schematic view showing a schematic movement, a data and a flow of instructions according to the embodiment of the present invention, and outlines of the movement and the process according to the embodiment of the present invention are explained. The server 4 is a site providing the performance data. When a user accesses to the server 4 by using a browser of the personal computer 2, a site is booted up in the server 4 and indicated on the personal computer 2. Then the performance data transmission controlling program is downloaded from the server 4. Also, at the same time, a HTML file data for a window display is provided. By that, the initial window of the FIG. 4A is displayed on the personal computer 2. Then, during an access to the server 4, a listening trial process, a purchasing process and a confirming process are executed by operating switches (window switches) a SW1, a SW2 and a SW3 of the initial window with the mouse or the like.

Figure 4B:
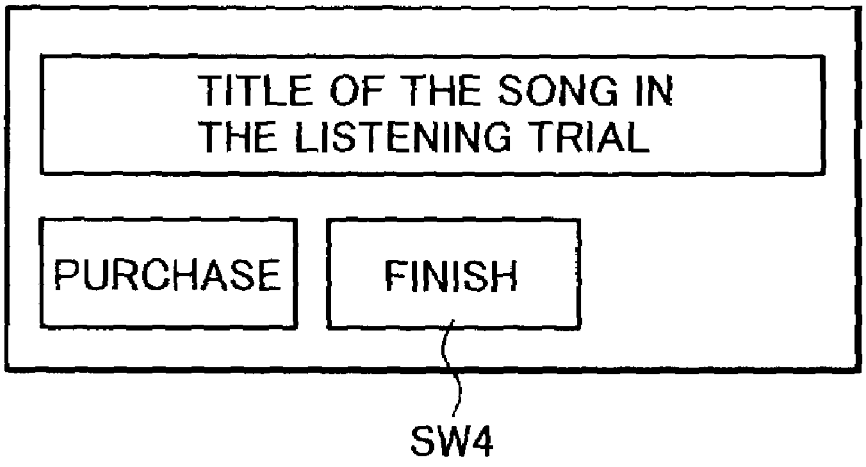

When a request for a listening trial is transmitted to the server 4 after selecting a desired song at the initial window, the HTML file data is transmitted from the server 4, and the listening trial window of FIG. 4B is displayed. Also, an encoded (a first encoding) performance data for a listening trial is transmitted from the server 4 to the personal computer 2. The personal computer 2 decodes (a first decoding) that and transmits an instruction to the electronic organ 1 to fix the electronic organ 1 as a listening trial mode. Then, it configures not to be able to output the performance data for a listening trial that will be transmitted to the electronic organ later.

The electronic organ 1 generates a key for re-encoding, and the personal computer 2 newly encodes (a second encoding) the performance data for a listening trial based on the key. Then the encoded data is included in a standard MIDI exclusive data and transmitted to the electronic organ 1. The electronic organ 1 extracts the encoded data from the received exclusive data and decodes (a second decoding) based on the above-described key to acquire the performance data for a listening trial. A method of the above-described first encoding is different from the second encoding. Each of the different method is respectively suited to a data communication standard (a data format of the transmitted data) between the server 4 and the personal computer 2, or a data communication standard between the computer 2 and the electronic organ 1. The performance data encoded by the first encoding is a data format which can be used in a communication between the server 4 and the personal computer 2, and the performance data encoded by the second encoding is a data format which can be used in a communication between the personal computer 2 and the electronic organ 1.

As described above, the automatic musical performance or the musical performance with the musical keyboard (that is, a listening trial of the reproduction state) can be performed based on the performance data for a listening trial in the electronic organ 1. Then, when a finishing switch SW 4 is operated at the listening trial window of the personal computer 2 to finish the listening trial, the personal computer 2 transmits an instruction to release the mode to the electronic organ 1. By that, the electronic organ 1 deletes the stored performance data for a listening trial and cancels the listening trial mode with permitting other data to be output, edited, or the like.

When the performance data is purchased after the above-described listening trial, a song (for example, a song performed listening trial) is selected to transmit a purchasing request to the server 4. Then the server 4 executes a charging process and the encoding process (the first encoding) of the performance data for a purchase to transmit to the personal computer 2, and the personal computer 2 executes the decoding process (the first decoding) of that. Then the personal computer 2 confirms whether the floppy disk is ready or not in the electronic organ 1. The electronic organ 1, corresponding to the above, executes format of the floppy disk and securing an empty storage area if it is necessary, and it transmits a result (status information) to the personal computer 2. Then when the empty storage area is secured in the formatted floppy disk, the personal computer 2 proceeds to the process to transmit the performance data for a purchase.

The process to transmit the performance data for a purchase is the same as that in the case of the performance data for a listening trial, and the mode fixing instruction to the electronic organ 1, the key generating process in the electronic organ 1, the re-encoding process (the second re-encoding) in the personal computer 2, the MIDI data generating process and in the personal computer 2 and the re-encoding process in the electronic organ 1 are executed. Then the re-encoded performance data for a purchase in the electronic organ 1 is stored in the storage unit (the floppy disk) and is made a protection. Then the mode fixed state of the electronic organ 1 is released as same as the case of the performance data for a listening trial.

Figure 6:
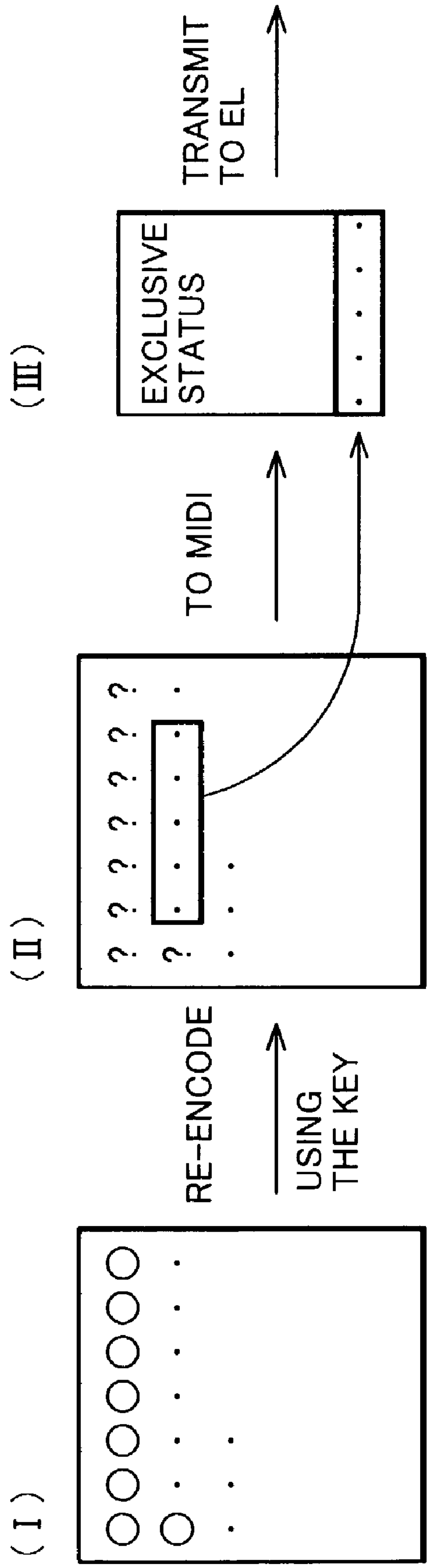
FIG. 6 shows a concept of a second encoding according to the embodiment of the present invention.

FIG. 6 shows a concept of the second encoding executed in the personal computer 2. As shown in (I), the re-encoded performance data for one file (for one song) provided from the server 4 is in a MIDI format or the like and a predetermined event data for reproducing the song stored in order. Each circle mark of (I) represents each event data (timing data and MIDI event data, etc.), and each data is stored in a processing order. A series of the data for one file of (I) is converted (re-encoding) to a series of data that cannot reproduce the original performance data by a normal reading method (a reading method to read a series of bits in order from a head of the file) by using a key received from the electronic organ 1. Then the converted series of data are converted into a data format that can be transmitted to the electronic organ 1 (that is, making the series of data into a MIDI data). The above-described process is called a second encoding process.

There are a method to convert the series of data (a series of bits) of (i) into a new series of data by shifting the series of data (a series of bits) of (I) forward or backward for an amount (bits) represented by the key by a bit (shifting a top data to last and a last data to top) and a method to convert the series of data (a series of bits) of (I) into a new series of data by replacing an order of a part of the series of data (a series of bits) that the key received from the electronic organ 1 directed along with a replacing order directed by the received key. The series of data of (I) of which contents are broken by these converting methods is an enumeration of broken data as (II) that cannot be reproduced the original performance data with the normal reading method.

Then, as shown in (III), the series of data of (II) is taken in each predetermined length (for the number of predetermined bits) in order from the top, and a number that represents the taken data and the taken order is processed to an exclusive data of a message containing the number (which represents a system exclusive message data based on the MIDI standards) to transmit to the electronic organ 1. This generating and transmitting process is executed repeatedly until all data is taken from the series of data of (II). Further, in the electronic organ 1, data received from the personal computer 2 are restored (the second recoding) to the original performance data by the reversed steps.

Moreover, the second-encoded data in the above is encoded to be matched with a transmission path independent from the transmission path according to the communication network 3 between the personal computer 2 and the server 4. That is, each encoded data is embedded in the exclusive data based on the MIDI standards and a data matched with the transmission path by a MIDI cable between the electronic organ 1 and the personal computer 2.

Figure 7:
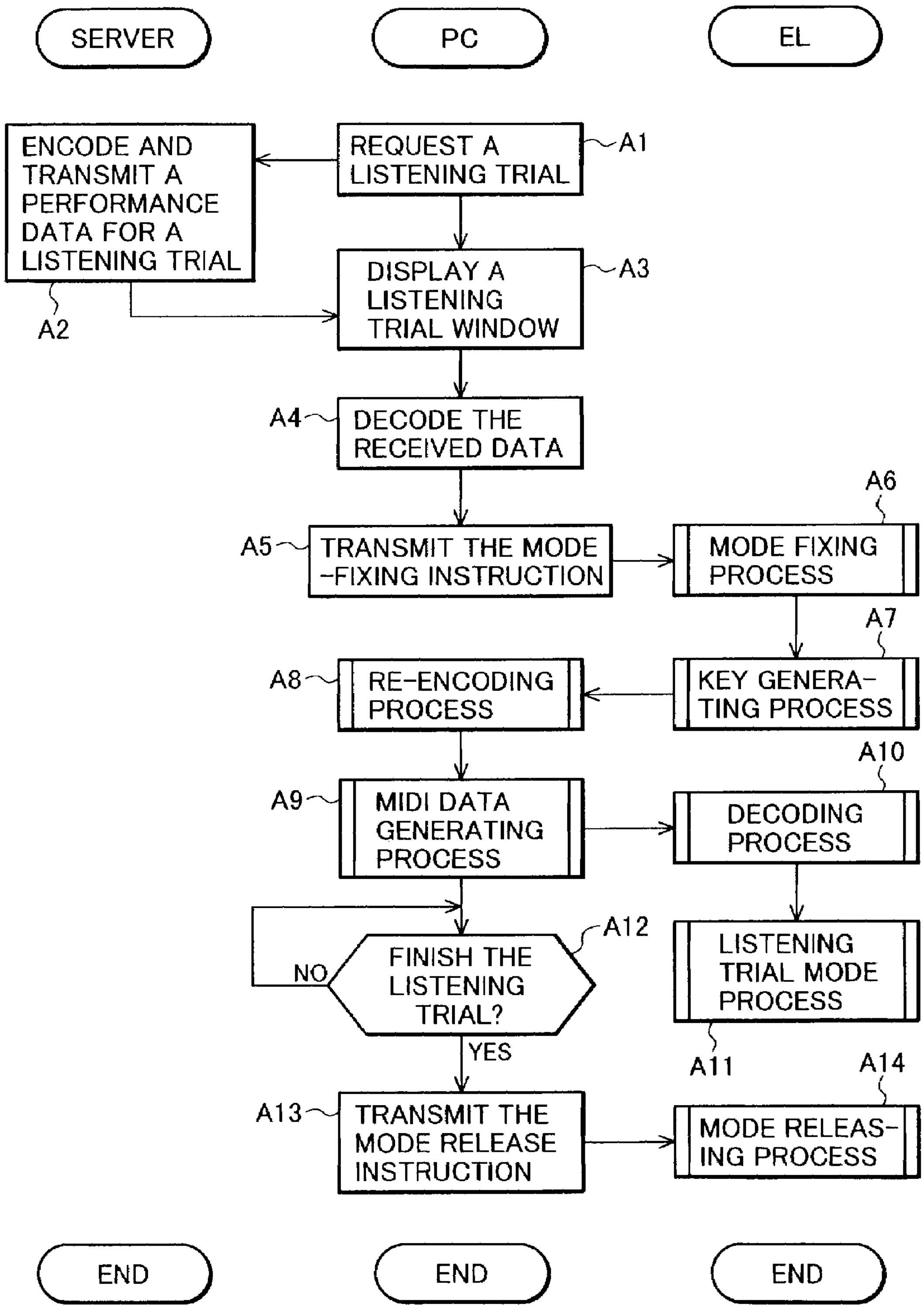
FIG. 7 is a diagram showing processes of a server, a personal computer and the electronic organ when a listening trial process according to the embodiment of the present invention is executed.

FIG. 7 is a diagram showing processes of the server 4, the personal computer 2 and the electronic organ 1 when the listening trial process is executed according to the embodiment of the present invention. Further, the listening trial process in the below, a purchasing process described later and processes shown in each flow chart described later are corresponded to the performance data transmission controlling program in the personal computer 2 and the performance data acquiring program in the electronic organ 1.

The personal computer 2 is connected to the server 4 via the communication network 3 before the process of FIG. 7 is started. Also, the performance data transmission controlling program is downloaded from the server 4 to the personal computer 2, and the initial window (FIG. 4A) is displayed.

First, since a song list N (FIG. 4A) is displayed on the initial window, a desired song is selected by operating the listening trial switch SW 2, and a listening trial is requested from the personal computer 2 to the sever 4 (Step A1 in FIG. 7). By that, the server 4 reads out the performance data for a listening trial of the requested song from the database and encodes the performance data for a listening trial in the MIDI format with a predetermined condition (the first encoding process) to transmit to the personal computer 2 (Step A2). Moreover, the first encoding process is the same as that according to the prior art, and data after encoding is a format that can be transmitted by the communication network 3. Also, a HTML file for displaying a window for the listening trial is transmitted from the server 4.

Next, in the personal computer 2, the listening trial window (FIG. 4B) is displayed (Step A3), and the data transmitted from the server 4 is decoded (the first decoding process) to the performance data for a listening trial in the MIDI format (Step A4). Then an instruction for fixing the mode is transmitted to the electronic organ 1 (Step A5).

Figure 8:
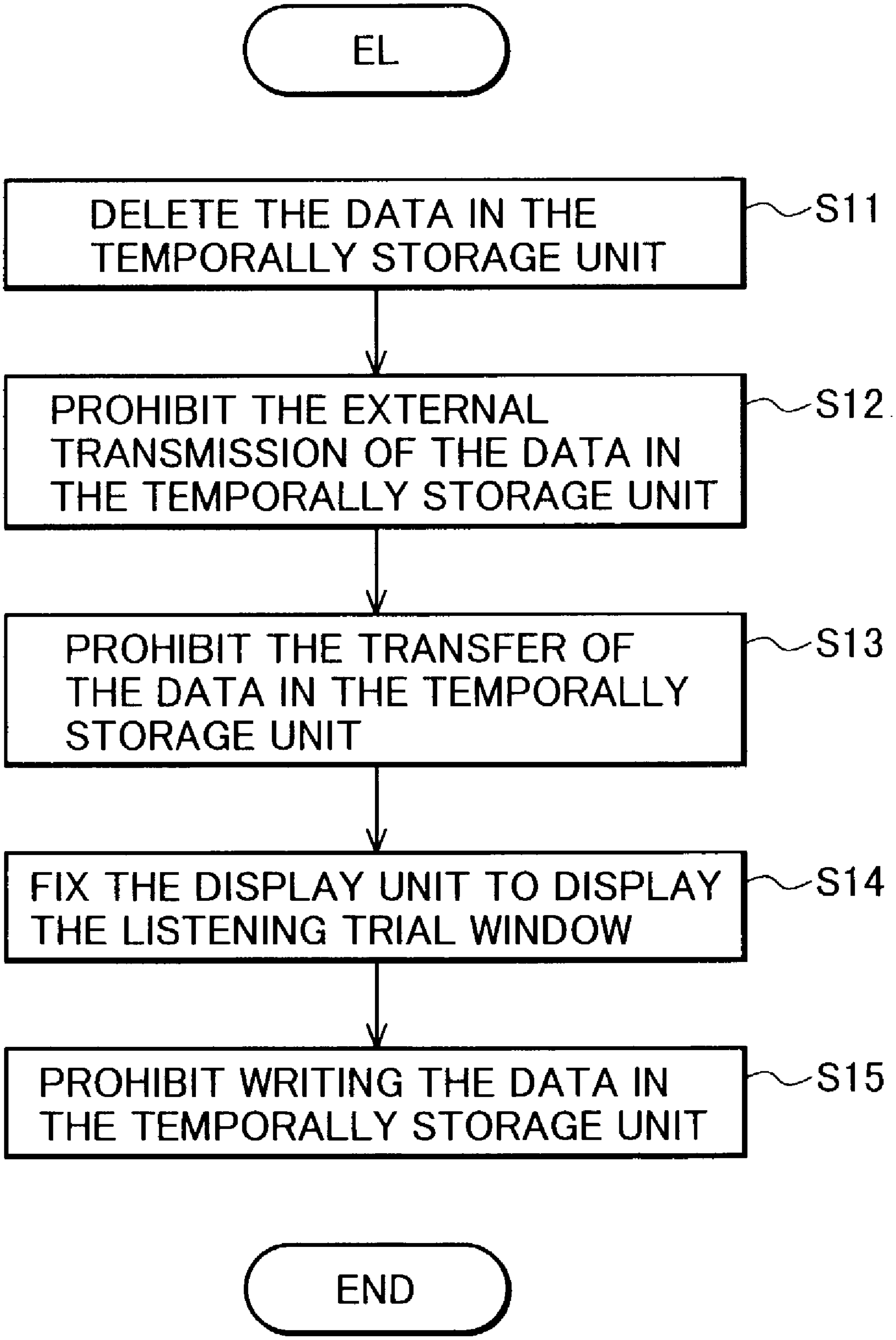
FIG. 8 is a flow chart showing a mode fixing process according to the embodiment of the present invention.
Figure 9:
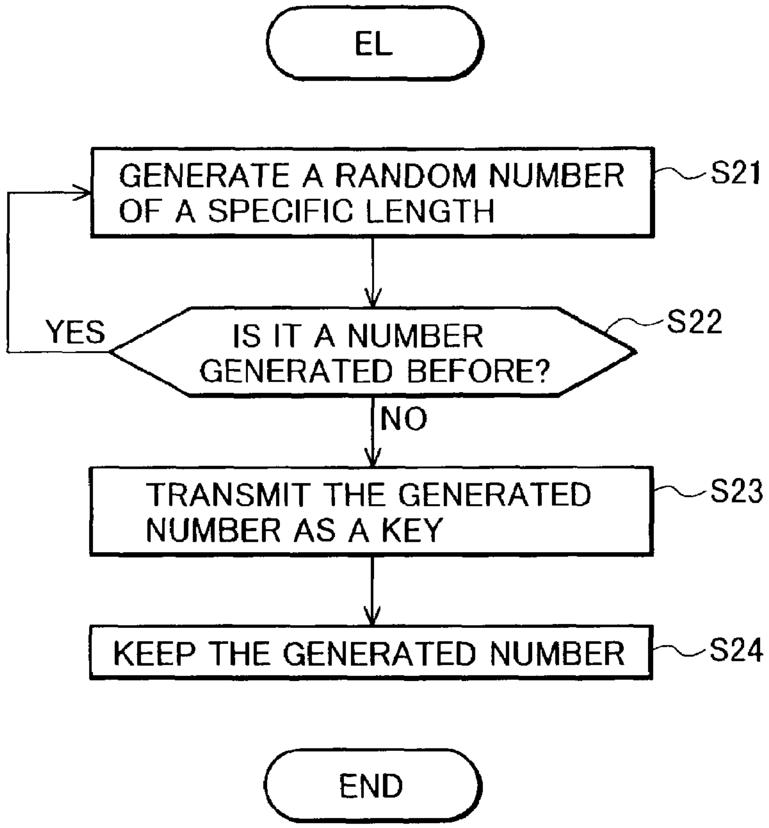
FIG. 9 is a flow chart showing a key generating process according to the embodiment of the present invention.

In the electronic organ 1, when the instruction from the personal computer 2 is received, a later-described mode fixing process shown in FIG. 8 is executed, and the performance data for a listening trial received after that is set not to be output to an outside (Step A6). Next, a key generating process for generating a key shown in FIG. 9 is executed, and a key for encoding (the second encoding process) the performance data for a listening trial provided from the personal computer 2 is newly generated to be transmitted to the personal computer 2 (Step A7).

Figure 10:
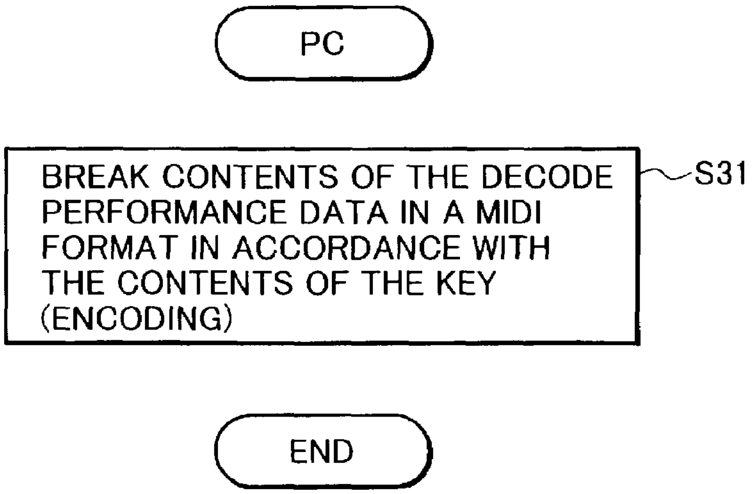
FIG. 10 is a flow chart showing a re-encoding process according to the embodiment of the present invention.
Figure 11:
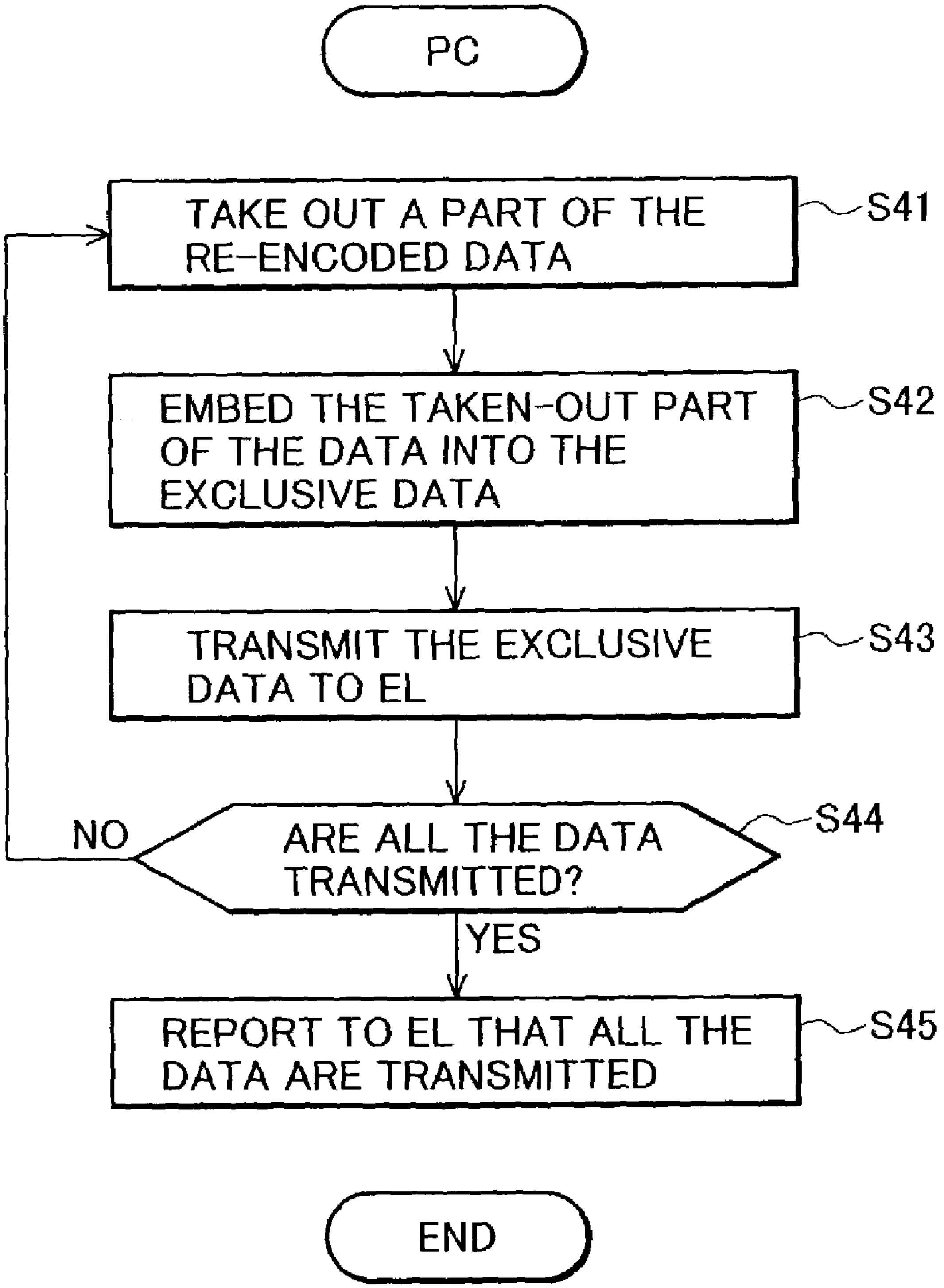
FIG. 11 is a flow chart showing a MIDI data generating process according to the embodiment of the present invention.

In the personal computer 2, when the key is received, a re-encoding process shown in FIG. 10 is executed, and the performance data for a listening trial for one file (for one song) is encoded (the second encoding process) in accordance with the key as described before (Step A8). Then a MIDI data generating process shown in FIG. 11 is executed, and the encoded data is embedded in the exclusive data to be transmitted to the electronic organ 1 (Step A9).

Figure 12:
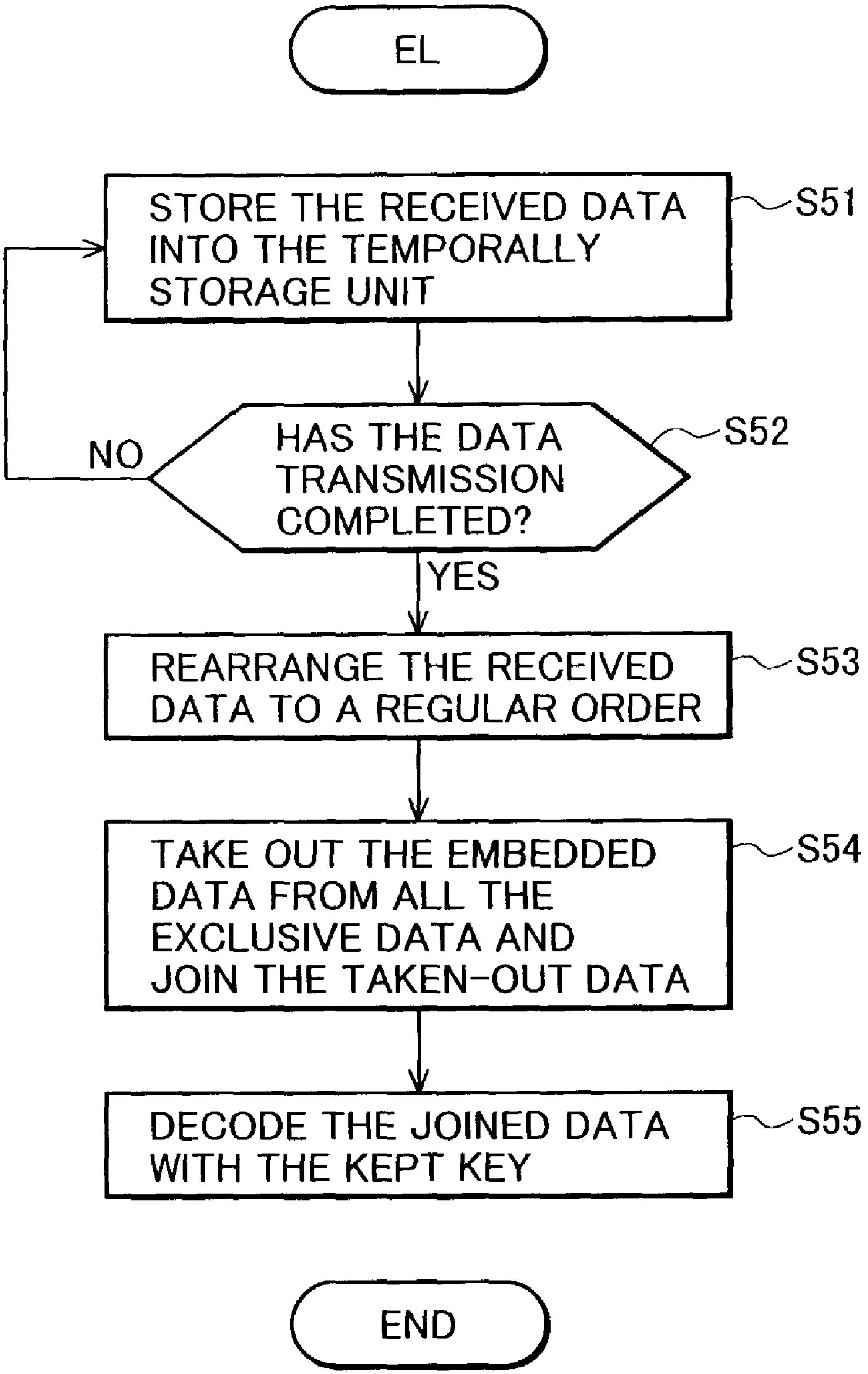
FIG. 12 is a flow chart showing a decoding process according to the embodiment of the present invention.
Figure 13:
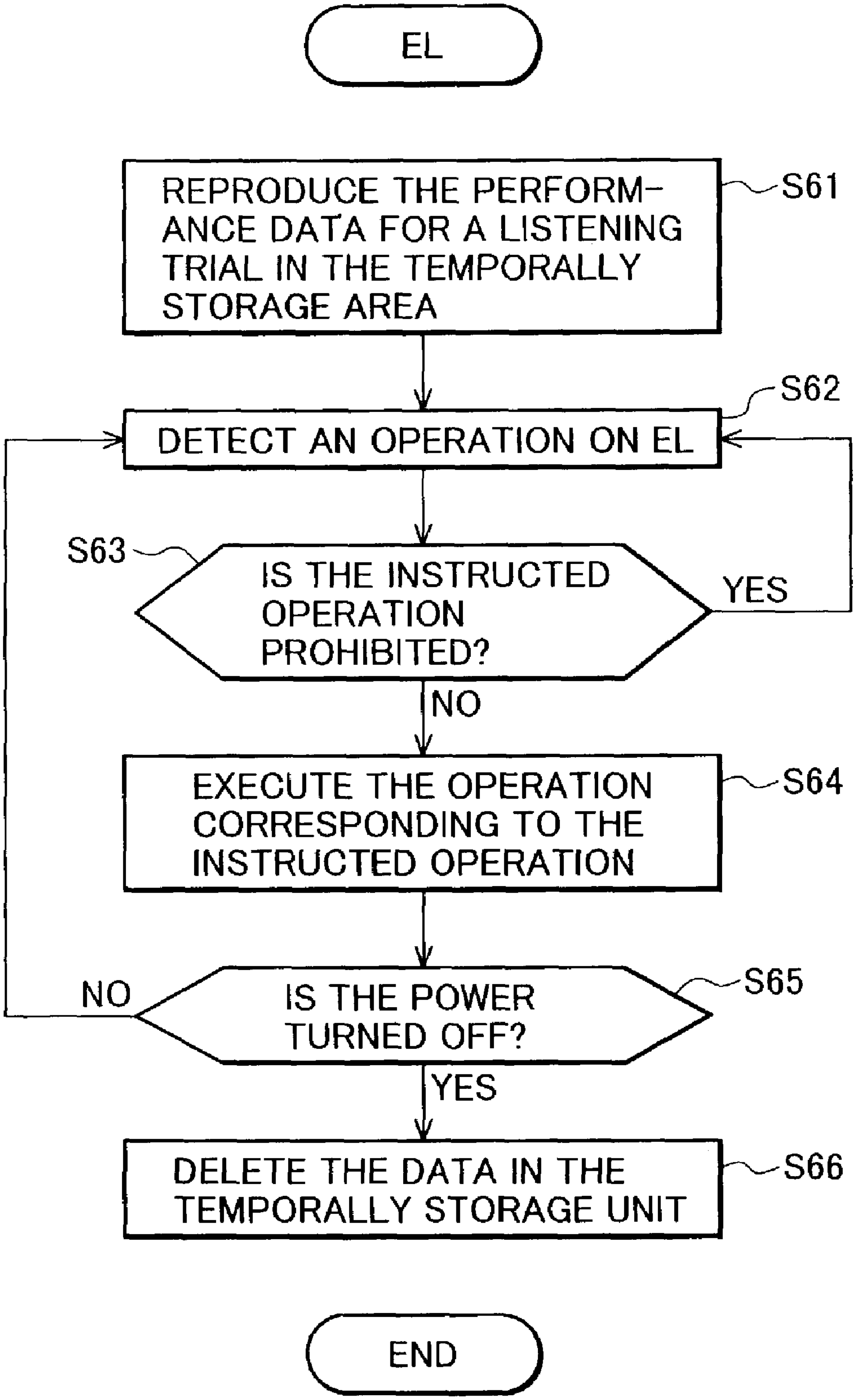
FIG. 13 is a flow chart showing a listening trial mode process according to the embodiment of the present invention.

Next, in the electronic organ 1, a decoding process shown in the FIG. 12 is executed, and all the exclusive data for one file from the personal computer 2 is received to be decoded (the second decoding process) to the performance data for a listening trial (Step A10). Then a listening trial mode process shown in FIG. 13 is executed, and the decoded performance data for a listening trial is reproduced (Step A11). That is, the operations other than the operation to output to an outside of the electronic organ 1 are executed normally.

Figure 14:
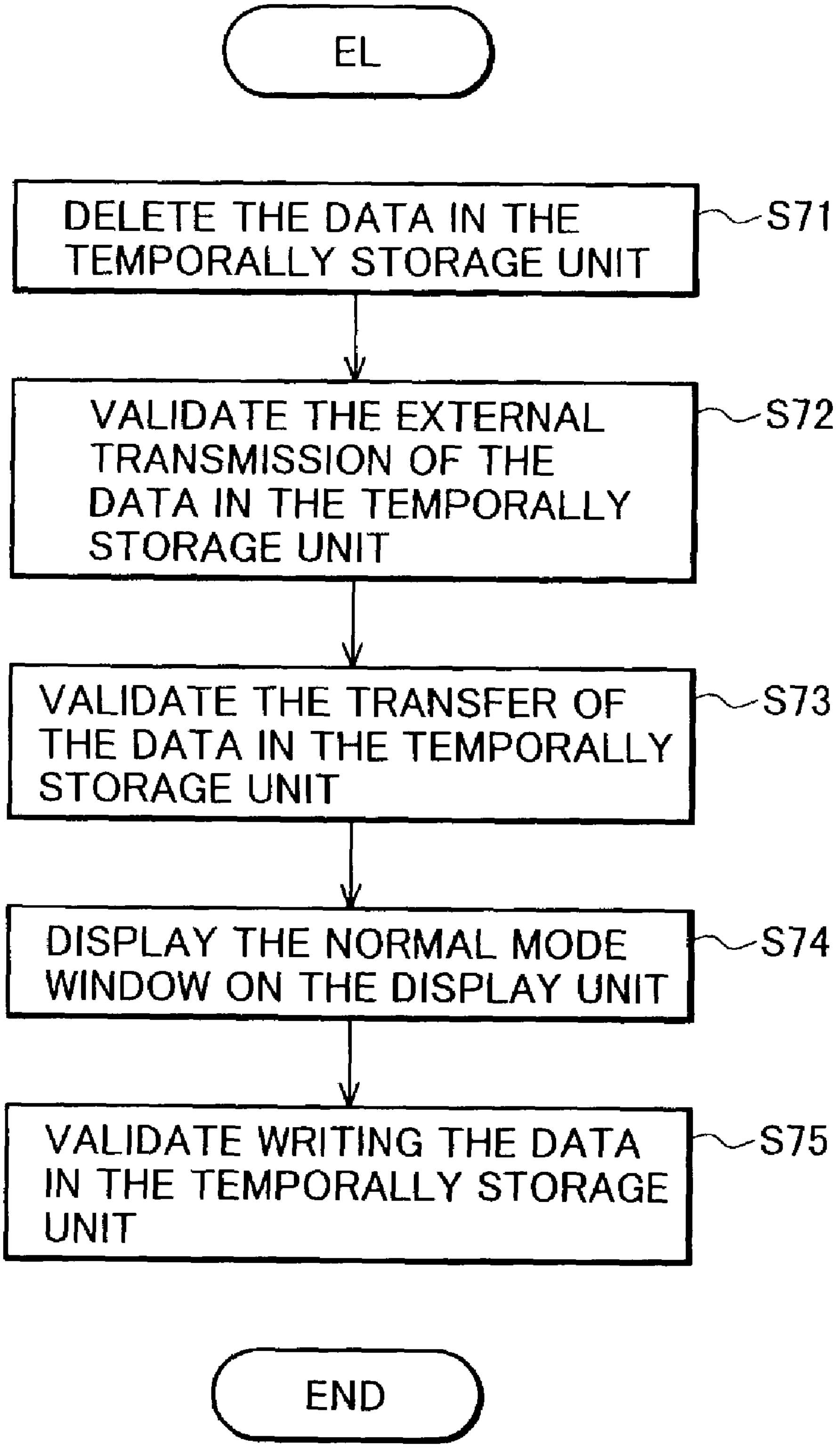
FIG. 14 is a flow chart showing a mode release process according to the embodiment of the present invention.

On the other side, in the personal computer 2, operation of the switch SW 4 for terminating the listening trial window (FIG. 4B) is detected, and whether an instruction to finish listening trial is judged (Step A12). When there is an instruction to finish the listening trial, an instruction to release the mode is transmitted to the electronic organ 1 (Step A13). Then in the electronic organ 1, a mode releasing process for releasing the mode shown in FIG. 14 is executed, and the performance data for a listening trial in the memory is deleted in order to make other data stored in the memory able to be output to an external device after that (Step A14).

Next, concrete processes of Steps A6 to A11 and A14 are explained based on the flowcharts shown in FIG. 8 to FIG. 14. When the electronic organ 1 receives an instruction to fix the mode from the personal computer 2 (Step A6), it starts the mode fixing process shown in FIG. 8 with replying to the instruction. First, data in the temporary storage unit set in the RAM 10*c* or the like is deleted beforehand at Step 11, and external transmission of data from the temporary storage unit is prohibited at Step 12. Further, a transfer of data in the temporary storage unit is prohibited at Step 13. Then, at Step 14, the displaying unit (10*j* in FIG. 3) is fixed to display the listening trial window in order not to be switched to display other windows, and any writing of data into the temporary storage unit is prohibited at Step 15. Further, this writing prohibition of the temporary storage unit is only to prohibit writing by an external operation for editing the performance data for a listening trial in the temporary storage unit by using the switch 10*h* of the electronic organ 1, and as later described, in the internal process of the electronic organ 1, the writing such as writing of the performance data for a listening trial transmitted from the personal computer 2 is executed depending on the necessity.

A status after executing each setting of the above Steps S11 to S15 is the "listening trial mode", and the received performance data for a listening trial cannot be output (transmitted) to an external device in this listening trial mode. Further, the listening trial window of the above-described displaying unit is, for example, a similar window to that shown in FIG. 4B. By that, it can be confirmed to be fixed to listening trial mode on the electronic organ 1 side. Also, in this listening trial mode, it is preferable to prohibit transferring or editing contents of the performance data for a listening.

When the electronic organ 1 finishes the mode fixing process, that is, it finishes mode fixing, it starts the key generating process shown in FIG. 9. First, a random number of a specific length is generated at Step 21, and whether this generated number is the number generated before or not is judged at Step 22. When it is the number generated before, the process returns to Step 21. And when it is not the number generated before, the generated number is transmitted as a key for re-encoding process to the personal computer 2 at Step 23. Then the generated key is maintained for decoding process at Step 24. Further, the stored numbers (keys) that are generated before may be excluded from the judgment index one after another when the history become relatively old.

When the personal computer 2 receives the key from the electronic organ 1, corresponding to that, it executes a re-encoding process (the second re-encoding process) shown in FIG. 10 which is corresponding to (I) to (II) of FIG. 6. Then, the personal computer 2 breaks the contents of the above-described decoded (the first decoding process) performance data for a listening trial in a MIDI format to encode (the second encoding process) in accordance with the contents of the key. Next, the personal computer 2 executes the MIDI data generating process shown in FIG. 11 corresponding to (II) to (III) in FIG. 6. Then, a part of the data re-encoded at Step S31 in FIG. 10 is taken out at Step S41, and the taken-out part of the data is embedded in the exclusive data at Step S42. Then the exclusive data is transmitted to the electronic organ 1 at Step S43, and whether all the re-encoded data are transmitted or not is judged. When all the data is not transmitted, the process repeats the processes after Step S41. And when all the data are transmitted, it is reported that all the data have transmitted to the electronic organ 1 at Step 45.

When the data transmission from the personal computer 2 is started, the electronic organ 1 starts the decoding process (the second decoding process), the received data is stored in the temporary storage unit at Step S51, and whether the data transmission has completed or not is judged at Step S52. When it has not completed, the process returns to Step S51, and when it has completed, the process proceeds to Step S53. That is, after the electronic organ 1 receives that the transmission from the personal computer 2 has completed, it executes the next decoding process. The received data is rearranged to a regular order based on the number which represents the order of data at Step S53, and all the data embedded in the exclusive data is taken out and joined together. Then the decoding process (the second decoding process) is executed by using the maintained key at Step S55.

When the above-described decoding process is finished, the electronic organ 1 starts the listening trial mode process in FIG. 13, and it reproduces the performance data for a listening trial in the temporary storage unit at Step S61. In this reproducing process, the reproducing state data (registration data) in the performance data for a listening trial is assigned to the register switch. Moreover, when the song data is included in the performance data for a listening trial, the automatic musical performance is executed based on the song data. Then an operation on the operation panel of the electronic organ 1 is detected at Step S63, and whether the instructed (detected) operation is the prohibited action in the listening trial mode or not is judged. The prohibited actions are copying, editing, etc. of the performance data for a listening trial in the temporary storage unit, and the operation to execute the actions are, for example, operations to release the listening trial mode, to transmit (output) the performance data for a listening trial to an external device, to transfer the performance data for a listening trial to other storage unit of the electronic organ 1, to copy the performance data for a listening trial and to edit contents of the performance data for a listening trial. Conversely, unprohibited (authorized) operation is an operation to perform a listening trial by using the performance data for a listening trial such as various musical performances using the musical keyboard or an alternation of the reproduction state, and the operations to execute those operations are, for example, various performance operations of the musical keyboard, operation of the register switch for alternating the reproduction state and operation to turn off the power of the electronic organ 1.

When the operation is prohibited, the operation is ignored, and the process returns to Step S62. When the operation is not prohibited, the operation corresponding to the instructed operation is executed at Step S64, and the process proceeds to Step S65. Whether the power is turned off or not is judged at Step S65, and when the power is not turned off, the process returns to Step S62, and when it is turned off, the data (the performance data for a listening trial) in the temporary storage unit is deleted and the listening trial mode is finished at Step S66.

Next, when finishing of the listening trial is instructed (Step A12 in FIG. 7) in the personal computer 2, a mode releasing instruction is transmitted from the personal computer 2 to the electronic organ 1, and the electronic organ 1 starts a mode releasing process in FIG. 14. First, the data in the temporary storage unit is deleted at Step S71, and the external transmission of data in the temporary storage unit is validated at Step S72. Further, data transfer in the temporary storage unit is also validated at Step S73. Next, a normal mode window is displayed on the displaying unit at Step S74, and data writing in the temporary storage unit is validated and the process is finished at Step S75. By that, after the listening trial, the performance data for a listening trial is deleted, and the electronic organ 1 returns to the normal state.

By the above process, in the listening trial mode, the reproduction state data assigned to the register switch is read out, and the musical performance with the musical keyboard can be performed in a state wherein the reproduction state of the electronic organ 1 is altered, and the song data for a listening trial stored in the temporary storage unit is executed for the automatic musical performance. Moreover, the operation of the external transmission of data in the temporary storage unit and the operation of contents modification will be prohibited, therefore an illegal copy of the performance data for a listening trial or the like can be prevented.

Figure 15:
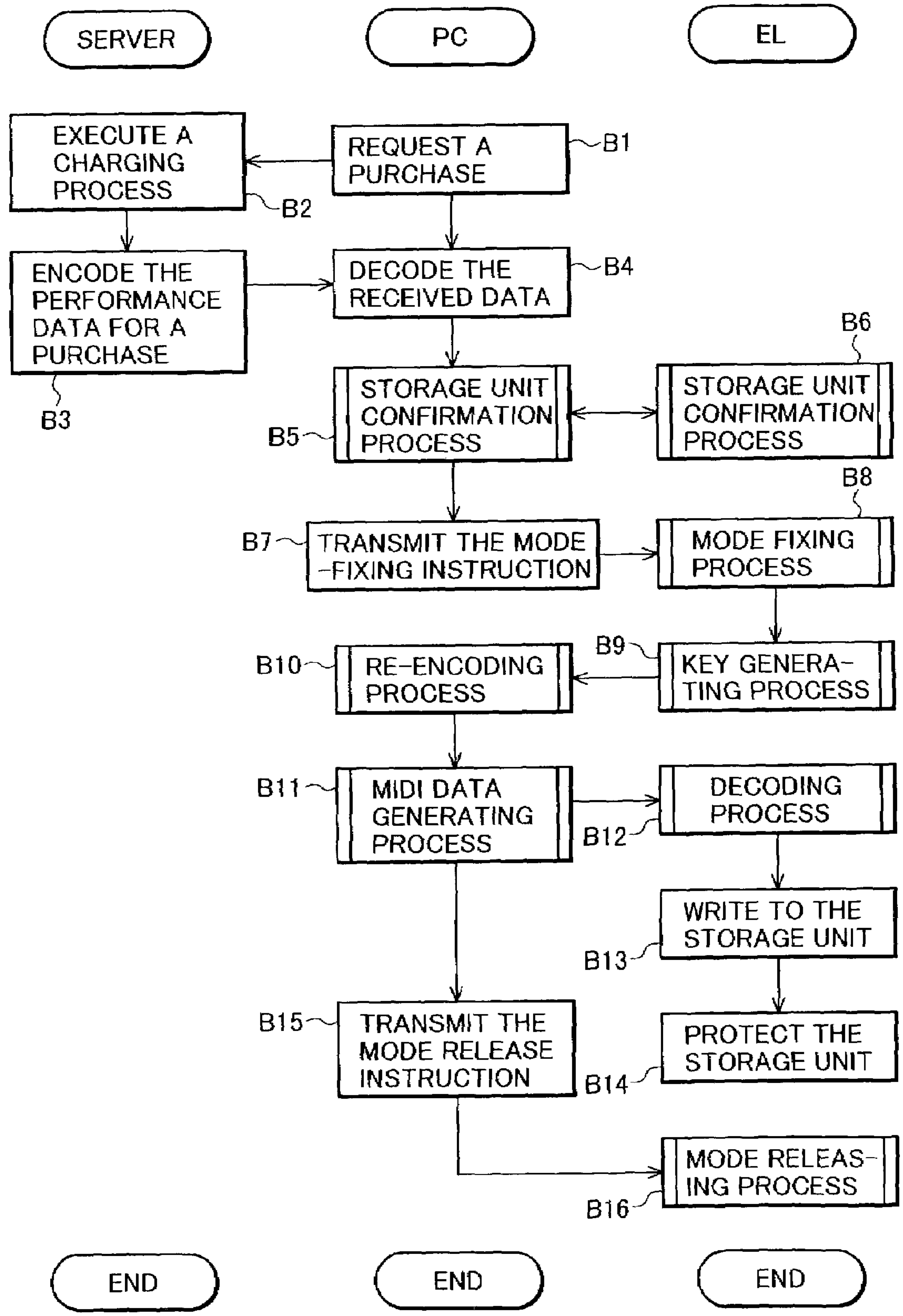
FIG. 15 shows processes of the server, the personal computer and the electronic organ when a purchasing process according to the embodiment of the present invention is executed.

FIG. 15 is a flow chart showing processes of the server 4, the personal computer 2 and the electronic organ 1 when a purchasing process is executed according to the embodiment of the present invention. A termination of a listening trial is instructed at Step A12 (FIG. 7) in the personal computer 2, the displaying window of the personal computer 2 returns the initial window shown in FIG. 4A. A desired song (for example, a song that has been listened for a trial) is selected on the initial window, and the purchasing switch SW1 is operated to request purchasing (Step B1). Then, the server 4 executes a charging process (Step B2) and encodes (the first encoding process) the performance data for a purchase to transmit it to the personal computer 2 (Step B3). Then the personal computer 2 receives and decodes the data (Step B4).

Figure 16:
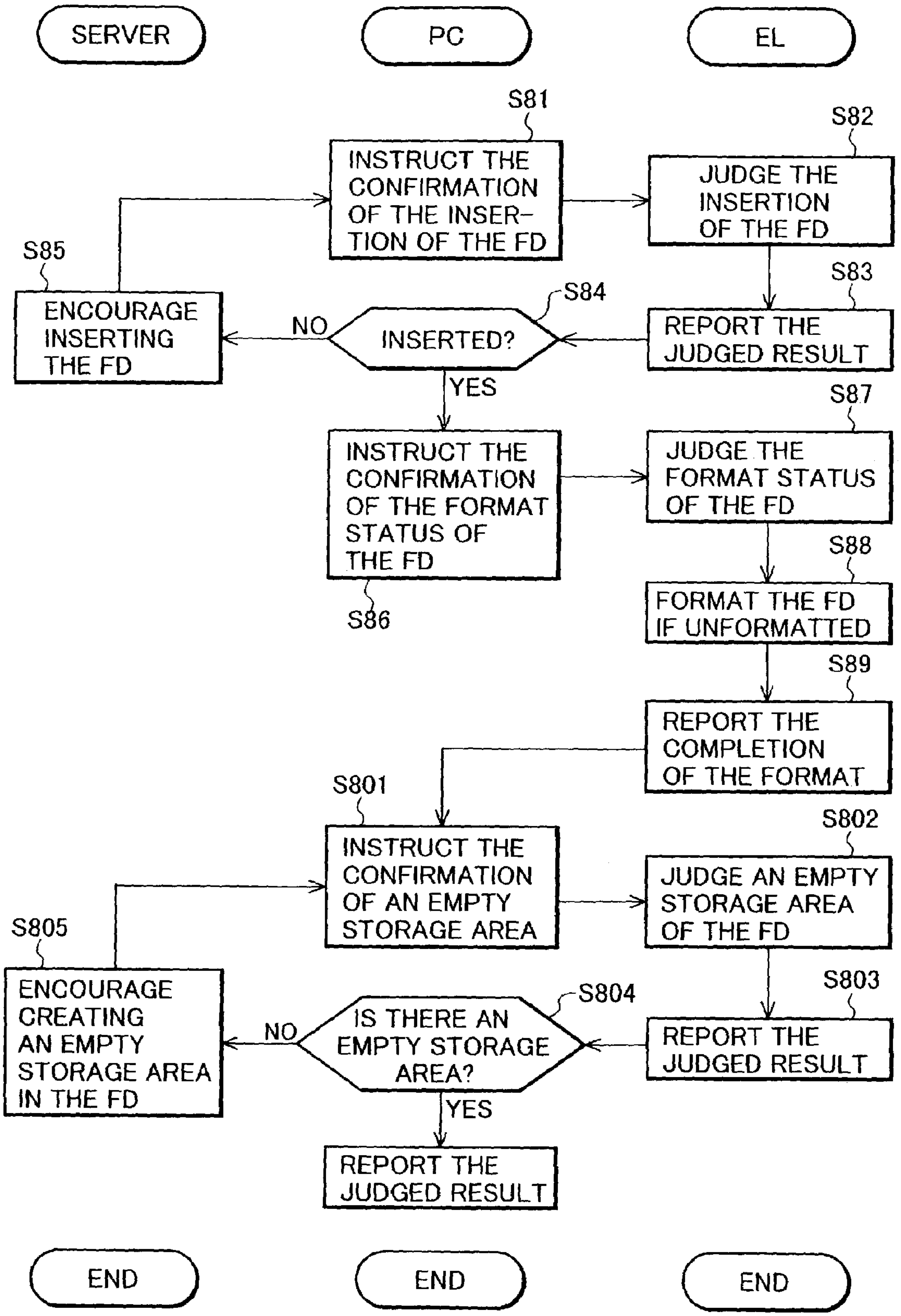
FIG. 16 shows a confirmation process according to the embodiment of the present invention.

After the decoding, the personal computer 2 and the electronic organ 1 execute a process for confirmation in FIG. 16 at Step B5 and B6, and whether a floppy disk (storage unit) in the electronic organ 1 is ready or not is confirmed. In the process for confirmation in FIG. 16, in the personal computer 2, a confirming instruction for confirming whether the floppy disk is inserted or not is transmitted to the electronic organ 1 at Step S81. By that, the electronic organ 1 judges whether the floppy disk is inserted or not at Step S82 and reports the judged result as status information to the personal computer 2 at Step S83. In the personal computer 2, whether the floppy disk is inserted or not is judged at Step S84, and when it is not inserted, a display encouraging insertion of the floppy disk to the electronic organ 1 is indicated at Step S85, and the process returns to Step S81.

A loop of Steps S81 to S85 is repeated until the floppy disk is inserted, and the insertion is confirmed regularly. Further, in this example, although the insertion of the floppy disk is regularly confirmed, the insertion of the floppy disk may be reconfirmed only when an OK switch on the window is pushed (clicked) on a window encouraging an insertion of the floppy disk.

When the floppy disk is inserted, a confirming instruction for confirming whether the floppy disk is unformatted or not is transmitted to the electronic organ 1. Then, the electronic organ 1 judges the format status of the floppy disk at Step S87, and when the floppy disk is unformatted, the floppy disk is formatted at Step S88. Also, the electronic organ 1 reports that the format has completed as status information to the personal computer 2 at Step S89. Next, the personal computer 2 transmits a confirming instruction for confirming whether there is an empty storage area in the floppy disk or not to the electronic organ 1. Moreover, at this time, a necessary capacity data for storing the performance data for a listening trial is also transmitted.

By that, the electronic organ 1 judges whether there is an empty storage area in the floppy disk or not at Step S802, and the judged result is transmitted as the status information to the personal computer 2 at Step S803. The personal computer 2 judges whether there is an empty storage area or not at Step S804, and when there is no empty storage area, the personal computer 2 indicates a display which encourages the floppy disk to create the region at Step S805, and the process returns to Step S801. When there is an empty storage region, the process proceeds to Step B7 in FIG. 15 to return purchasing action. Further, although this loop of Steps S801 to S805 is repeated until the empty storage region is created, whether there is an empty storage region or not may be reconfirmed only when the OK switch on the window that encourages creating the empty storage area may be pressed (clicked).

Processes of Steps B7 to B12 in FIG. 15 execute processes for the performance data for a purchase that are similar to those of Steps A5 to A10 in FIG. 7 for the performance data for a listening trial, and therefore detailed explanation is omitted. By these processes, prohibitions of the external transmission, transfer and writing of data in the temporary storage unit as described before are set until the mode is released after the performance data for a purchase is stored in the floppy disk.

In the electronic organ 1, when the decoding process is terminated at Step B12, the decoded performance data for a purchase is stored in the floppy disk (storage unit) at Step B13, the floppy disk (storage unit) is protected, and the process is terminated at Step SB14. This protection is a process for prohibiting copying of the performance data for a purchase from the floppy disk, and well-known technique is applied.

On the other hand, in the personal computer 2, all the data re-encoded by the MIDI data generating process at Step B11 is transmitted, an instruction to release the mode is transmitted to the electronic organ 1 (Step B15), and the electronic organ 1 executes a process to release the mode in accordance with the instruction (Step A16). Further, the process to release the mode at Step A16 is the same as the above-described process in FIG. 14, and by the mode releasing process, the performance data for a purchase is deleted, and the electronic organ returns to the normal state.

By the above-described processes, whether there is a floppy disk or not, a format status and whether there is an empty storage region can be confirmed automatically, and the provided performance data can be acquired securely. Also, when the performance data is transmitted from the personal computer 2 to the electronic organ 1, the data is re-encoded in the personal computer 2 and transmitted to the electronic organ 1. Since the performance data will be valid when the data is re-decoded by using the key in the electronic organ 1, the data output from the personal computer via the MIDI cable cannot be used as the performance data in the state as it is. Therefore illegal usage or the like can be prevented.

Although the mode release is instructed when all the data are transmitted by the MIDI data generating process (Step B11) in the personal computer 2, the personal computer 2 may instruct to release the mode upon a reception of a request to release the mode from the electronic organ 1 after the protection of the floppy disk is terminated in the electronic organ 1.

Although the performance data for a listening trial is stored in the server 4 in the embodiment of the present invention, the performance data for a listening trial may not be prepared, and when a listening trial is requested, a performance data for a listening trial of which a specific information is deleted from the performance data for a purchase may be created to provide for a listening trial.

Also, a setting instruction for a listening trial may be transmitted from the server to the electronic organ via the personal computer other than from the personal computer. By doing that, a provider of the performance data for a listening trial can protect the performance data securely.

Also, when the personal computer connects to the site, the electronic organ is set to be the listening trial mode, and the listening trial mode can be continued without releasing the mode until the personal computer gets out of the site, or the electronic organ or the personal computer is turned off.

Also, before confirming action of the floppy disk, whether the electronic organ is connected or not is confirmed, and when it is not connected, connection of the electronic organ may be encouraged. Then, after the connection of the electronic organ is confirmed, the confirming action of the floppy disk may be executed.

Although, in the embodiment of the present invention, the judged results of whether there is a floppy disk or not, a format status and whether there is an empty storage region are transmitted to the personal computer one by one, these plurality of confirmed results may be judged at one time to transmit the judged results as the status information at once to the personal computer.

Although, the case that a floppy disk is used as the storage unit is explained in the embodiment of the present invention, when the electronic organ has plural kinds of storage units, any one of the storage units may be selected for storing the performance data for a purchase. The storage unit is selected by a user on the personal computer or on the electronic organ, or automatically by the personal computer or by the electronic organ, or anything that can be used. In the case of selection by the electronic organ, the selection of the storage unit is reported to the personal computer, and confirming action and purchasing action similar to the above are executed in the storage unit as a storage unit for storing the performance data for a purchase.

Also, the encoding at the time of transmitting the performance data from the server to the personal computer and the encoding at the time of transmitting the performance data from the personal computer to the electronic organ may be executed by any encoding methods as far as each created data as a result of the encoding is a format which can communicate through communication paths between the server and the personal computer, and the personal computer and the electronic organ. Further, the method according to the embodiment of the present invention is one of the preferable methods in the point of convenience of the processes and security of the protection.

The encoding in the personal computer is not limited to the encoding all the data of one file at once, however, it may be anything that changes the file to be a format that can be output via the MIDI terminal and cannot be reproduced (decoded) to the original performance data by simply reproducing the file. For example, only a part of the performance data for one file is encoded by using the key, and it is embedded in the exclusive data to transmit, and other data may be transmitted as it is.

When the electronic organ connects directly to the server, the above-described action by the personal computer can be executed by either one of the electronic organ and the server. In this case, re-encoding is not necessary. The server may execute the encoding process executed by the personal computer to transmit the performance data to the electronic organ. An interface that can receive the encoded data by the encoding process by the server is provided to the electronic organ, and the electronic organ may execute the decoding process executed by the personal computer. In this case, the server executes a part of the confirming actions that the personal computer executes. That is, the server transmits the confirming instruction for confirming the status of the storage unit (for example, a floppy disk) to the electronic organ, and the electronic organ transmits the status information of the storage unit that is similar to the above-described embodiment to the server. Also, the server executes indication or the like to encourage setting the performance data to the state that can be stored in the storage unit to the electronic organ.

In the above-described embodiment, although the personal computer as the performance data transmission controlling apparatus that is connected to the server is explained as an example, in the case that a first electronic musical instrument as a performance data transmission controlling apparatus is directly connected to the server to connect other electronic musical instrument to the first electronic musical instrument, the function of the personal computer 2 should be executed by the first electronic musical instrument, and the functions of the electronic organ 1 should be executed by the other electronic musical instrument. In this case, the first musical instrument may have an interface for receiving the encoded data by the encoding process executed by the server.

In the above-described embodiment, although the electronic organ is used as an example of as an electronic musical instrument, a type of the electronic musical instrument may be anything. Moreover, although the case that the performance data includes the reproduction state data (registration data) for the electronic organ is explained, the performance data may, for example, contain only a song data. Moreover, the type of the performance data may be anything.

The present invention has been described in connection with the preferred embodiments. The invention is not limited only to the above embodiments. It is apparent that various modifications, improvements, combinations, and the like can be made by those skilled in the art.

What are claimed are:

1. A performance data transmission controlling apparatus, comprising:

a first transmitting device that transmits a confirming instruction for instructing an external device to confirm a status of a storage unit of the external device;

a receiving device that receives status information representing a condition that a storage medium to which a performance data can be stored is connected to the storage unit of the external device; and a second transmitting device that transmits the performance data to the external device when the receiving device receives the status information representing the condition that the storage medium to which the performance data can be stored is connected to the storage unit of the external device;

wherein the transmission of the confirming instruction by the first transmitting device and the receiving of status information by the receiving device occurs independent of whether the storage medium has been previously connected to the storage unit.

2. A performance data transmission controlling apparatus according to claim 1, further comprising an encouraging device that encourages to set the storage unit to be able to store a performance data when the receiving device receives the status information representing that the storage unit of the external device cannot store the performance data.

3. A performance data transmission controlling apparatus according to claim 1, further comprising:

a communication interface that connects with a server; and a requesting device that requests the server to confirm the status of the storage unit of the external device, and wherein the first transmitting device transmits the confirming instruction for instructing the external device to confirm the status of the storage unit of the external device in accordance with a response of the server.

4. An electronic musical apparatus, comprising:

a memory that stores a performance data;

a first receiving device that receives a confirming instruction from an external device;

a generating device that generates status information representing a condition that the memory to which the performance data can be stored is connected to a storage unit in accordance with the received confirming instruction;

a transmitting device that transmits the generated status information to the external device;

a second receiving device that receives the performance data from the external device; and a recording device that records the received performance data into the memory;

wherein the receiving of the confirming instruction by the first receiving device and the transmission of status information by the transmitting device occurs independent of whether the memory has been previously connected to the storage unit.

5. A computer-readable media containing a program which a computer can execute for realizing a performance data transmission controlling process, the program comprising instructions for:

(a) transmitting a confirming instruction for instructing an external device to confirm a condition that a storage medium to which a performance data can be stored is connected to a storage unit of the external device;

(b) receiving status information representing condition that the storage medium to which the performance data can be stored is connected to the storage unit of the external device; and (c) transmitting a performance data to the external device when the status information is received;

wherein the instructions for transmitting the confirming instruction and receiving the status information occur independent of whether the storage medium has been previously connected to the storage unit.

6. A computer-readable media containing a program which a computer can execute for realizing a performance data acquiring process, the program comprising instructions for:

(a) receiving a confirming instruction from an external device;

(b) generating status information representing a condition that a memory to which performance data can be stored is connected to a storage unit in accordance with the received confirming instruction;

(c) transmitting the generated status information to the external device;

(d) receiving performance data from the external device; and (e) recording the received performance data into the memory;

wherein the receiving of the confirming instruction and the transmitting of the status information occurs independent of whether the memory has been previously connected to the storage unit.

* * * * *